United States Patent [19]

Choi

[11] Patent Number: 5,617,396
[45] Date of Patent: Apr. 1, 1997

[54] DISK TRAY HAVING A SYSTEM FOR RETAINING A DISK AT A POSITION THEREIN

[75] Inventor: Young S. Choi, Seoul, Rep. of Korea

[73] Assignee: Daewoo Electronics Co., Ltd., Seoul, Rep. of Korea

[21] Appl. No.: 269,380

[22] Filed: Jun. 30, 1994

[30] Foreign Application Priority Data

Jun. 30, 1993 [KR] Rep. of Korea ............. UM 93-11883

[51] Int. Cl.$^6$ ............. G11B 33/02; G11B 5/02; G11B 5/10; G11B 23/10
[52] U.S. Cl. ........................... 369/77.2; 369/292
[58] Field of Search .................. 369/77.2, 282, 369/292, 258, 261, 263, 291; 360/99.06, 96.5; 206/307, 308.1, 308.3, 387.1, 387.12; 200/341, 342, 159 R; 250/46.1; 248/610, 611, 613, 618, 619, 623

[56] References Cited

U.S. PATENT DOCUMENTS

| | | | |
|---|---|---|---|
| 3,927,252 | 12/1975 | Polley | 369/261 |
| 3,939,318 | 2/1976 | Brown et al. | 200/159 R |
| 4,773,061 | 9/1988 | Stark et al. | 369/291 |
| 4,837,786 | 6/1989 | Yamamori | 369/292 |
| 4,893,295 | 1/1990 | Matsuura et al. | 364/75.2 |
| 5,025,436 | 6/1991 | Crain et al. | 369/77.2 |
| 5,331,627 | 6/1994 | Childers et al. | 369/292 |

FOREIGN PATENT DOCUMENTS 5658177  5/1981  Japan.
1049160  2/1989  Japan.

*Primary Examiner*—John H. Wolff
*Assistant Examiner*—Adriana Giordana
*Attorney, Agent, or Firm*—Nixon & Vanderhye P.C.

[57] ABSTRACT

A disk tray comprises a disk receiving recess formed in the disk tray and larger than a disk to be accommodated therein. Two retainers are disposed at respective one of two side walls of the disk receiving recess adjoining with each other. Each retainer includes a base plate, an abutment protrusion disposed at the middle of the base plate and having a smooth inclined upper surface, and springs disposed at both ends of the base plate. Each abutment protrusion extends through each side wall into the disk receiving recess. Springs are fixed at the outer surface of the side walls facing away from the disk receiving recess. By the disk tray, a disk can be easily accommodated in the disk receiving recess and the accommodated disk can be prevented from moving.

3 Claims, 3 Drawing Sheets

DISK TRAY HAVING A SYSTEM FOR RETAINING A DISK AT A POSITION THEREIN

BACKGROUND OF THE INVENTION

1. Field of the Invention

The present invention relates to a disk tray of a mini disk player, and more particularly to a disk tray of a mini disk player having a system for retaining a disk cartridge at a predetermined position therein.

2. Prior Art

A front loading disk player is a disk player, into out-of which a disc is inserted/ejected through a front side thereof. In a general disk player, out-of/into the disk player housing is inserted/ejected only a disk alone, or a disk carried by a carrier which is usually a disk tray.

FIG. 1 shows a disk player of U.S. Pat. No. 4,893,295 schematically as a conventional front loading disk player. The disk player includes a disk tray 5 for carrying a disk 4, in the upper surface of which are formed two circular recesses 5a, 5b, in which a circular disk 4 can be accommodated.

In this construction, in order for disk 4 to be loaded at an accurate position so that the operations such as reproduction, etc. of the disk player may be performed without a hitch, disk 4 must be placed in a proper position and retained therein so as not to be out of its position. Therefore, it is preferred that the shape and the size of disk 4 to be coincident with those of recesses 5a and 5b. However, it is not easy to form recesses of very precise size in a disk tray, which is usually manufactured by injection molding of a plastic. Further, it is not easy to insert disk 4 in recesses 5a and 5b when the sizes of disk 4 and recesses 5a and 5b are equal to each other. Meanwhile, when the sizes of recesses 5a and 5b are larger than the size of disk 4, the position of disk 4 in recesses 5a and 5b is liable not to be fixed but to be changed while disk 4 is carried by disk tray 5 or when an external impact is applied to disk 4, which may cause considerable damage to the operational function of the disk player.

SUMMARY OF THE INVENTION

The present invention has been made to overcome the above-described problems, and therefore it is an object of the present invention to provide a disk tray of a mini disk player on which a disk cartridge can be easily put and in which the disk cartridge can be retained without moving, thereby ensuring a precise loading of a disk cartridge in a disk player.

To achieve the above object, the present invention provides a disk tray comprising a rectangular disk receiving recess formed in the disk tray and larger than a disk cartridge to be accommodated therein; and retainers for retaining a disk cartridge at a position in the disk receiving recess.

Preferably, each of the retainers may comprise a base plate, an abutment protrusion disposed at the middle of the base plate and springs disposed at the opposite ends of the base plate in both sides of the abutment protrusion, and may be disposed at each of two side walls of the disk receiving recess adjoining with each other, the abutment protrusion extending through each of the two side walls into the disk receiving recess, and the springs being fixed at outer surfaces of the side walls facing away from the disk receiving recess. Each abutment protrusion has a smooth inclined upper surface.

According to the above construction, when the disk cartridge is pushed downward into the disk receiving recess of the disk tray, the disk cartridge is lowered down to be in contact with the abutment protrusion. And then, the disk cartridge goes on lowering down with sliding on the abutment protrusion and pushing outward of the disk receiving recess. When the disk is completely to be accommodated in the disk receiving recess, the abutment protrusions are in contact with the disk cartridge to urge it by biasing force of the springs, and thereby the disk can be retained at a propel position in the disk receiving recess.

Therefore, a disk cartridge can be loaded precisely in the disk player and prevented from being out of its position regardless of an external impact, and a disk cartridge can be easily accommodated in the disk receiving recess of the disk tray.

BRIEF DESCRIPTION OF THE DRAWINGS

The above object, and other features and advantages of the present invention will be apparent by describing the preferred embodiments of the present invention hereinafter with reference to the accompanying drawings, in which.

DESCRIPTION OF THE PREFERRED EMBODIMENT

Figure 1:
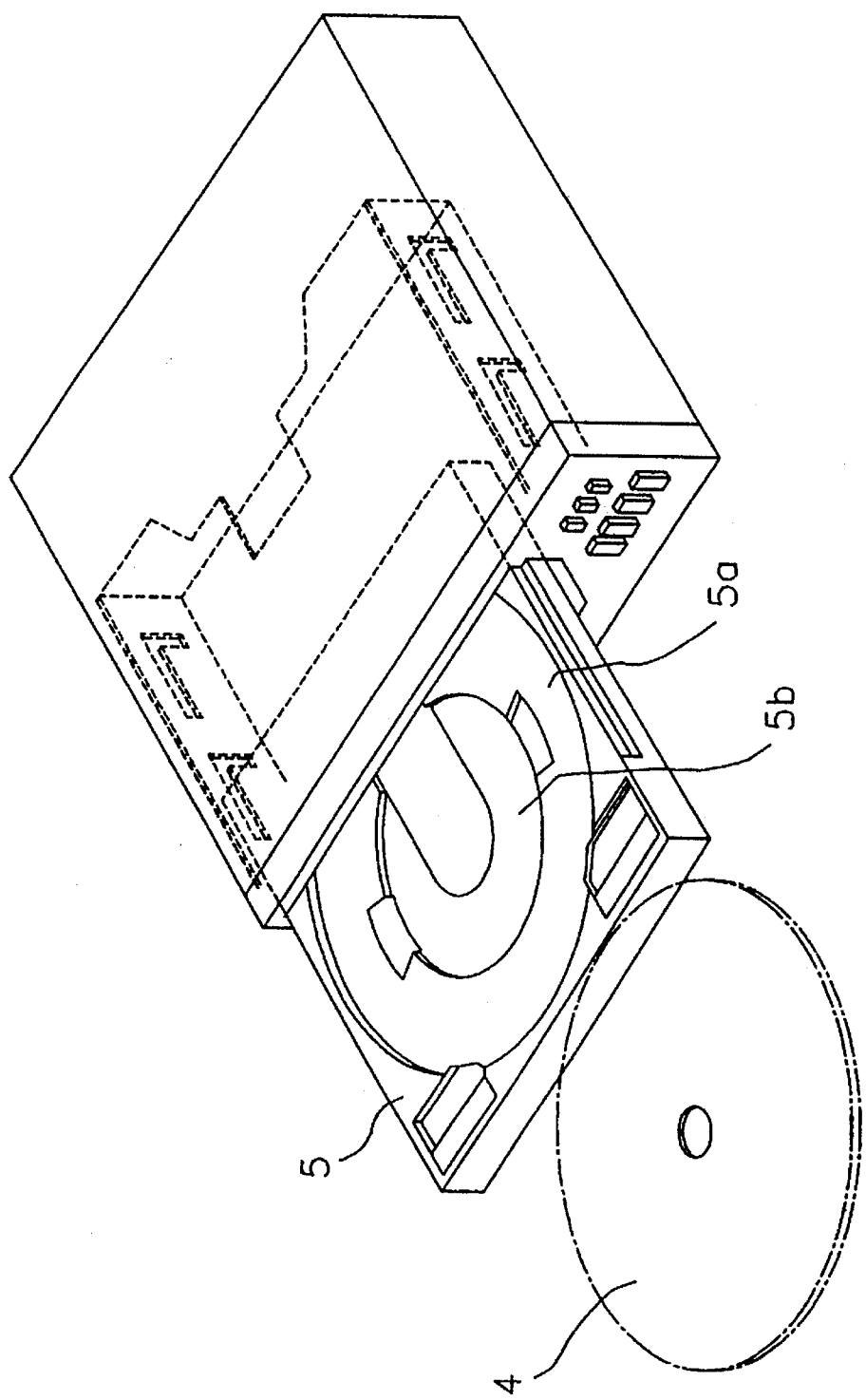
FIG. 1 is a schematic perspective view of a disk player having a conventional disk tray.
Figure 2:
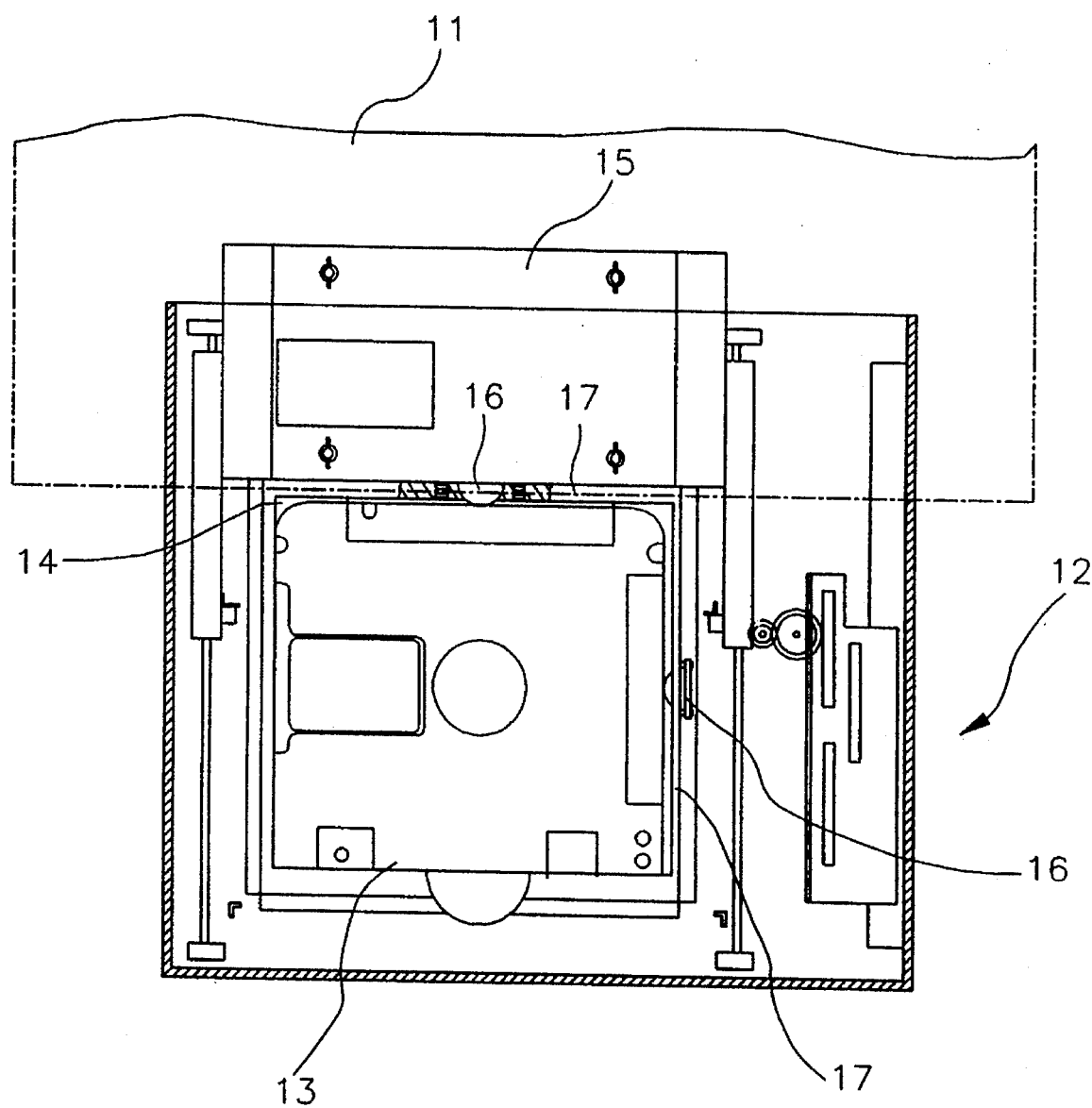
FIG. 2 is a schematic plan view of a disk tray of a mini disk player according to an embodiment of the present invention, in which a disk cartridge is accommodated.

FIG. 2 shows a mini disk tray 12 according to one embodiment of the present invention. In tray 12 is formed a disk receiving recess 14, which is somewhat larger than a disk cartridge 13 to be accommodated therein. Disk cartridge 13 contains a mini disk which is not shown. Disk receiving recess 14 is rectangular, and two retainers 16 for retaining disk cartridge 13 at a proper position in disk receiving recess 14 are disposed at two side walls 17 adjoining with each other, in such a manner that one is disposed at upper side wall 17 and the other at right side wall 17.

Further, disk tray 12 shown in FIG. 2 includes a tray cover 15 which covers over disk receiving recess 14 having disk cartridge 13 accommodated therein, to protect disk cartridge 13 after disk tray 12 is inserted into a housing 11 of the disk player.

Figure 3:
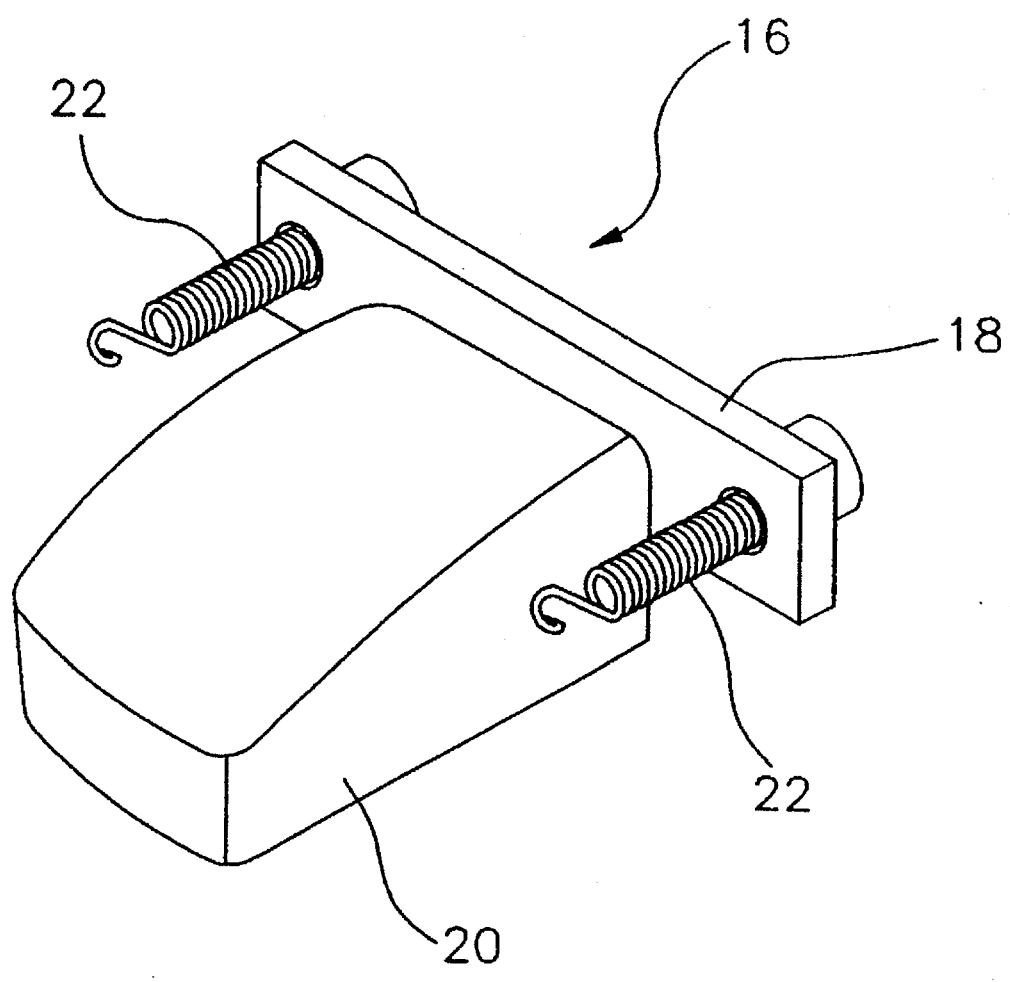
FIG. 3 is an enlarged perspective view of a retainer of the disk tray, shown in FIG. 2.

Meanwhile, as shown in FIG. 3, which is an enlarged view of retainer 16, retainer 16 comprises a base plate 18, an abutment protrusion 20 protruding forward from the middle of base plate 18, and two springs 22 disposed at the opposite ends of base plate 18 in both sides of abutment protrusion 20. Abutment protrusion 20 has a smooth inclined upper surface which is inclined down toward a bottom of the disk receiving recess 14.

Each of two springs 22 has a first and a second ends. The first ends of the two springs 22 are connected to the base plate 18 at opposite sides of abutment protrusion 20 and the second ends of the two springs 22 are connected to one of side walls 17.

Each retainer 16 is disposed one by one at each one of two side walls 17 of disk receiving recess 14 adjoining with each other. Each abutment protrusion 20 respectively extends through each side wall 17 into disk receiving recess 14. Springs 22 are fixed at to the outer surface of side walls 17 facing away from the disk receiving recess.

The outer surfaces face away from the disk receiving recess 14. The second ends of the two springs 22 are fixed at the outer surfaces of side walls 17 respectively.

Hereinafter, a process will be described in that disk 13 comes to be accommodated in disk tray 12. First, when disk cartridge 13 is urged from the above of disk receiving recess 14 into disk receiving recess 14, disk cartridge 13 is lowered down to be in contact with abutment protrusion 20. Then, disk cartridge 13 slides on abutment protrusion 20 to while pushing abutment protrusion 20 outward. When disk cartridge 13 is completely accommodated in disk receiving recess 14, abutment protrusions 20 are in contact with disk cartridge 13 push it by biasing forces of springs 22, and thereby disk cartridge 13 is retained at a position without moving in disk receiving recess 14.

Therefore, according to the present invention, a disk cartridge can be retained at a position on the disk tray regardless of external impacts and incorrect loading of a disk cartridge can be prevented, and therefore the operational performance of the disk player can be improved.

Further, the size of the disk receiving recess can be larger than that of the disk cartridge , and preciseness of the size of the disk receiving recess is not necessarily required, thereby the disk tray can be easily manufactured.

Furthermore, the operation of inserting a disk in the disk receiving recess for loading the disk cartridge in the disk player can be easily performed.

When the mini disk cartridge has been inserted in the disk receiving recess, the two retainers push the mini disk cartridge against the other two adjoining walls at which no separate retainer is provided.

Therefore, the size-precision is required only in the other two adjoining walls at which the two retainers are not provided, and thereby it becomes far easier to form the disk receiving recess and the manufacturing cost of the tray is greatly reduced.

Having now fully described the invention, it will be apparent to a person skilled in the art that many changes and modifications can be made thereto without departing from the spirit and scope of the invention as set forth therein.

What is claimed is:

1. A disk tray of a mini disk player comprising:

a rectangular disk receiving recess formed in the disk tray and larger than a disk cartridge to be accommodated therein, the disk cartridge containing a mini disk and the rectangular disk receiving recess having four side walls; and two retainers, said retainers retaining the disk cartridge at a position in the rectangular disk receiving recess, each of the retainers including:
 (1) a base plate,
 (2) an abutment protrusion disposed at the middle of the base plate, and
 (3) two springs each spring having first and second ends, the first ends of the two springs being connected to the base plate at opposite sides of the abutment protrusion and the second ends of the two springs being connected to one of said side walls, said two retainers being disposed respectively at adjoining side walls of the disk receiving recess, each abutment protrusion extending from a respective base plate through an opening in a respective side wall into the disk receiving recess, each abutment protrusion having a smooth upper surface inclined toward a bottom plane of the disk receiving recess, and the second ends of the two springs being fixed at an outer surface of the respective side wall, the outer surface of said wall facing away from the disk receiving recess, whereby during insertion, the disk cartridge slides along the smooth upper surfaces of the abutment protrusions while pushing the abutment protrusions outward from the disk receiving recess, and then the disk cartridge is retained at a position in the disk receiving recess without movement through close contact with the abutment protrusions under the biasing force of the springs.

2. A disk tray of a mini disk player comprising:

a rectangular disk receiving recess formed in the disk tray and larger than a disk cartridge to be accommodated therein, the disk cartridge containing a mini disk and the rectangular disk receiving recess having four side walls; and two retainers, said retainers retaining the disk cartridge at a position in the rectangular disk receiving recess, each of the retainers including:
 (1) a base plate,
 (2) an abutment protrusion disposed at the middle of the base plate, and
 (3) springs, each spring having first and second ends, the first end of each spring being connected to the base plate adjacent the abutment protrusion and the second end of each spring being connected to one of said side walls, the two retainers being disposed respectively at two side walls of the disk receiving recess, the two side walls adjoining with each other, the abutment protrusion of each retainer extending through an opening in a respective side wall into the disk receiving recess, each abutment protrusion having a smooth upper surface inclined toward a bottom plane of the disk receiving recess, and the second end of each spring being fixed at an outer surface of the respective side wall, the outer surface of said side wall facing away from the disk receiving recess, whereby during insertion the disk cartridge slides along the smooth upper surface of the abutment protrusions while pushing the abutment protrusions outward from the disk receiving recess, and then the disk cartridge is retained at a position in the disk receiving recess without movement through close contact with the abutment protrusions under the biasing force of the springs.

3. A disk tray of a mini disk player comprising:

a rectangular disk receiving recess formed in the disk tray and larger than a disk cartridge to be accommodated therein, the disk cartridge containing a mini disk and the rectangular disk receiving recess having four side walls; and at least two retainers, said retainers retaining the disk cartridge at a position in the rectangular disk receiving recess, each of the retainers including:
 (1) a base plate,
 (2) an abutment protrusion disposed at the middle of the base plate, and
 (3) two springs each spring having first and second ends, the first ends of the springs being connected to the base plate at opposite sides of the abutment protrusion and the second ends of the springs being connected to one of said side walls, said at least two retainers being disposed respectively at at least two adjoining side walls of the disk receiving recess, each abutment protrusion extending through an opening in a respective side wall and into the disk receiving recess, the abutment protrusion having a smooth upper surface inclined toward a bottom plane of the disk receiving recess, and the second ends of said at least two springs being fixed at an outer surface of the respective side wall, the outer surface of each side wall facing away from the disk receiving recess.

* * * * *